(12) United States Patent
Hardee et al.

(10) Patent No.: US 10,839,699 B2
(45) Date of Patent: Nov. 17, 2020

(54) METHODS AND SYSTEMS FOR MANAGING AERIAL DRONES IN REGULATED SPACES WITH GROUND VEHICLE ASSIST

(71) Applicant: INTERNATIONAL BUSINESS MACHINES CORPORATION, Armonk, NY (US)

(72) Inventors: Christopher J. Hardee, Raleigh, NC (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 15/296,262

(22) Filed: Oct. 18, 2016

(65) Prior Publication Data
US 2018/0107209 A1    Apr. 19, 2018

(51) Int. Cl.
| G05D 1/00 | (2006.01) |
| G05D 3/00 | (2006.01) |
| G06F 7/00 | (2006.01) |
| G06F 17/00 | (2019.01) |
| G08G 5/00 | (2006.01) |
| G08G 1/00 | (2006.01) |
| G06Q 10/08 | (2012.01) |
| B64F 1/22 | (2006.01) |

(52) U.S. Cl.
CPC ......... *G08G 5/0069* (2013.01); *G06Q 10/083* (2013.01); *G08G 1/20* (2013.01); *G08G 1/202* (2013.01); *G08G 5/006* (2013.01); *G08G 5/0013* (2013.01); *G08G 5/0039* (2013.01); *B64F 1/222* (2013.01); *G05D 1/0011* (2013.01)

(58) Field of Classification Search
None
See application file for complete search history.

(56) References Cited

U.S. PATENT DOCUMENTS

| 8,082,102 | B2* | 12/2011 | Ravenscroft | ......... | G01C 21/005 |
|   |   |   |   |   | 701/2 |
| 8,511,606 | B1* | 8/2013 | Lutke | .................... | B64C 39/028 |
|   |   |   |   |   | 244/100 R |
| 9,928,474 | B1* | 3/2018 | Evans | .................. | G06Q 10/083 |

(Continued)

OTHER PUBLICATIONS

Oh et al., "Rendezvous and standoff target tracking guidance using differential geometry," Journal of Intelligent & Robotic Systems, 2013 (16 pages).
Sepulchre et al., "Stabilization of Planar Collective Motion: All-to-All Communication," IEEE Transactions on Automatic Control, vol. 52, No. 5, May 2007 (14 pages).
(Continued)

*Primary Examiner* — Harry Y Oh
(74) *Attorney, Agent, or Firm* — Griffiths & Seaton PLLC

(57) ABSTRACT

Embodiments for managing drones by one or more processors are described. An aerial drone is controlled to fly to a first location outside of a restricted airspace. The aerial drone is enabled to detachably couple to a ground vehicle at the first location outside of the restricted airspace. The ground vehicle travels through the restricted airspace from the first location outside of the restricted airspace to a second location outside the restricted airspace. The aerial drone is enabled to detach from the ground vehicle at the second location outside of the restricted airspace. The aerial drone is controlled to fly from the second location outside of the restricted airspace to a third location outside of the restricted airspace.

15 Claims, 12 Drawing Sheets

(56) References Cited

U.S. PATENT DOCUMENTS

| | | | | |
|---|---|---|---|---|
| 2012/0158280 A1* | 6/2012 | Ravenscroft | ......... | G01C 21/005 |
| | | | | 701/400 |
| 2015/0370251 A1 | 12/2015 | Siegel et al. | | |
| 2016/0196756 A1* | 7/2016 | Prakash | ................ | B64C 39/024 |
| | | | | 701/3 |
| 2016/0257401 A1* | 9/2016 | Buchmueller | ........ | B64C 39/024 |
| 2016/0304217 A1* | 10/2016 | Fisher | ..................... | B64F 1/222 |
| 2018/0046201 A1* | 2/2018 | Erickson | ................ | G01C 21/20 |

OTHER PUBLICATIONS

Goddemeier et al., "Role-Based Connectivity Management with Realistic Air-to-Ground Channels for Cooperative UAVs," IEEE Journal on Selected Areas in Communications, vol. 30, No. 5, Jun. 2012 (13 pages).

Cocchioni et al., "Unmanned Ground and Aerial Vehicles in Extended Range Indoor and Outdoor Missions," 2014 International Conference on Unmanned Aircraft Systems (ICUAS), May 27-30, 2014 (9 pages).

Mathew et al., "Multi-robot Rendezvous Planning for Recharging in Persistent Tasks," IEEE Transactions on Robotics, vol. 31, No. 1, 2015 (14 pages).

Daly et al., "Coordinated landing of a quad rotor on a skid-steered ground vehicle in the presence of time delays," Autonomous Robots, vol. 38, No. 2, 2015 (13 pages).

Maini et al., "On Cooperation Between a Fuel Constrained UAV and a Refueling UGV for Large Scale Mapping Applications," 2015 International Conference on Unmanned Aircraft Systems (ICUAS), Jun. 9-12, 2015 (8 pages).

\* cited by examiner

METHODS AND SYSTEMS FOR MANAGING AERIAL DRONES IN REGULATED SPACES WITH GROUND VEHICLE ASSIST

BACKGROUND OF THE INVENTION

Field of the Invention

The present invention relates in general to computing systems, and more particularly, to various embodiments for managing drones in or near regulated spaces.

Description of the Related Art

The use of drones, such as unmanned aerial vehicles (UAVs), has become increasingly prevalent in recent years. Besides recreational use, drones are now performing commercial and military tasks such as, for example, monitoring areas (e.g., for security purposes), searching areas for missing people and/or items, and visual productions (e.g., filming and photography). Additionally, it is expected that drones will be used to make deliveries in the near future (e.g., to deliver ordered products and/or items shipped from one location to another).

One of the problems associated with the use of drones for these tasks is that, for various reasons, it is undesirable for drones (e.g., UAVs) to travel in certain areas, at least during particular periods of time. For example, due to security and/or safety concerns, it is generally agreed that (at least some) UAVs should not be able to fly within a close proximity to airports and military installations. Additionally, even when not particularly close to an airport or military installation, due to, for example, aircraft flight paths, it may be desirable to restrict the altitude at which UAVs are permitted to fly. Further, because of privacy concerns, some people and/or neighborhoods may decide they simply do not want UAVs flying nearby.

Such regulated, or restricted, spaces may pose problems for the use of drones because, for example, although it may be technically possible for the drones to travel around and/or avoid the regulated spaces, the drones may not have sufficient power and/or range to do so and still reach destination (or return to their point of origin). Ideally, drones, such as UAVs, would be controlled and/or managed in such a way as to allow them to avoid restricted activity while maximizing their usable range.

SUMMARY OF THE INVENTION

Various embodiments for managing drones by one or more processors are described. In one embodiment, by way of example only, a method for managing drones, again by one or more processors, is provided. An aerial drone is controlled to fly to a first location outside of a restricted airspace. The aerial drone is enabled to detachably couple to a ground vehicle at the first location outside of the restricted airspace. The ground vehicle travels through the restricted airspace from the first location outside of the restricted airspace to a second location outside the restricted airspace. The aerial drone is enabled to detach from the ground vehicle at the second location outside of the restricted airspace. The aerial drone is controlled to fly from the second location outside of the restricted airspace to a third location outside of the restricted airspace.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
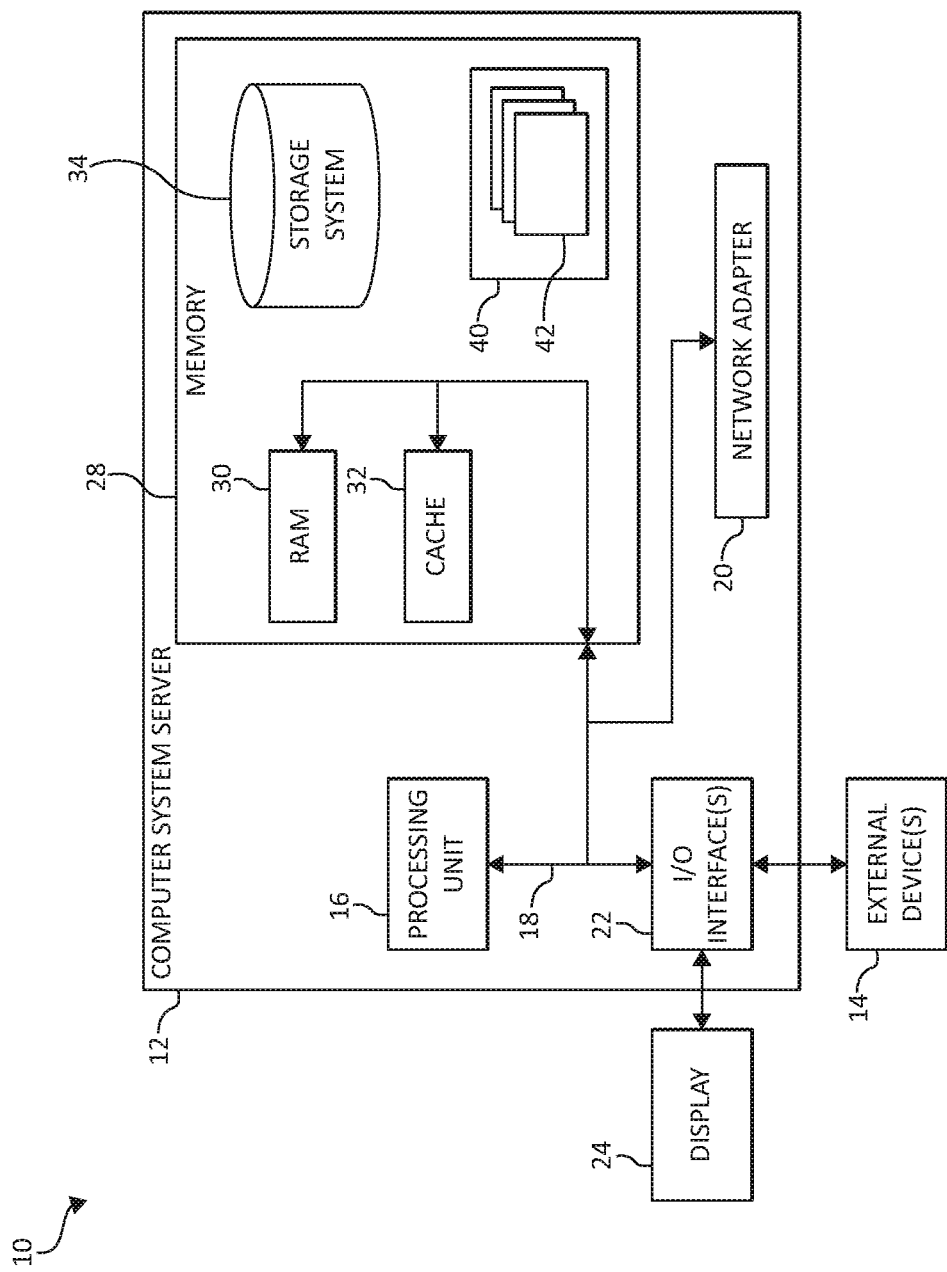
FIG. 1 is a block diagram depicting an exemplary computing node according to an embodiment of the present invention.

As previously indicated, one of the problems associated with the increasing use of drones, such as unmanned aerial vehicles (UAVs), is that it is undesirable for drones to travel in certain areas, at least under particular circumstances.

Consider an example in which a UAV is scheduled to perform a task, such as deliver an item, at a particular location, and the most direct route from the point of origin for the UAV and the delivery point traverses a regulated space (e.g., a restricted airspace). Depending on the range of the UAV and/or the size and shape of the regulated space, the UAV may not be able to deliver the product. For example, the UAV may not have sufficient range to fly the extended distance required by flying around the regulated space, as opposed to flying through it. In such a situation, using current drone systems, it may be necessary to schedule additional UAVs to assist in the delivery process and/or use an alternative delivery method.

In view of the foregoing, a need exists for drone management methods and systems in which drones, such as UAVs, would be controlled and/or managed in such a way as to allow them to avoid restricted activity while maximizing their usable range.

To address these needs, the methods and systems of the present invention manage drones, such as UAVs, in such a way that they are transported through regulated spaces and/or their range is otherwise extended by being detachably coupled to (e.g., landing on) other vehicles, such as ground vehicles. In some embodiments, an aerial drone (e.g., UAV) is controlled to fly to a first location outside of a restricted airspace. The aerial drone is enabled to detachably couple to a ground vehicle at the first location outside of the restricted airspace. The ground vehicle travels through the restricted airspace from the first location outside of the restricted airspace to a second location outside the restricted airspace. The aerial drone is enabled to detach from the ground vehicle at the second location outside of the restricted airspace. The aerial drone is controlled to fly from the second location outside of the restricted airspace to a third location outside of the restricted airspace.

In some embodiments, a route (e.g., an initial route) of the ground vehicle, which does not traverse (or travel across) the first location outside the restricted airspace, is unidentified. The ground vehicle may be selected from a plurality of ground vehicles, with each of the ground vehicles having a planned route that traverses the restricted airspace.

The aerial drone may be refueled (or charged) while the aerial drone is detachably coupled to the ground vehicle. The ground vehicle may be an unmanned ground vehicle (UGV).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in, for example, a drone (e.g., UAV), a ground vehicle (e.g., a UGV), and/or a warehouse. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
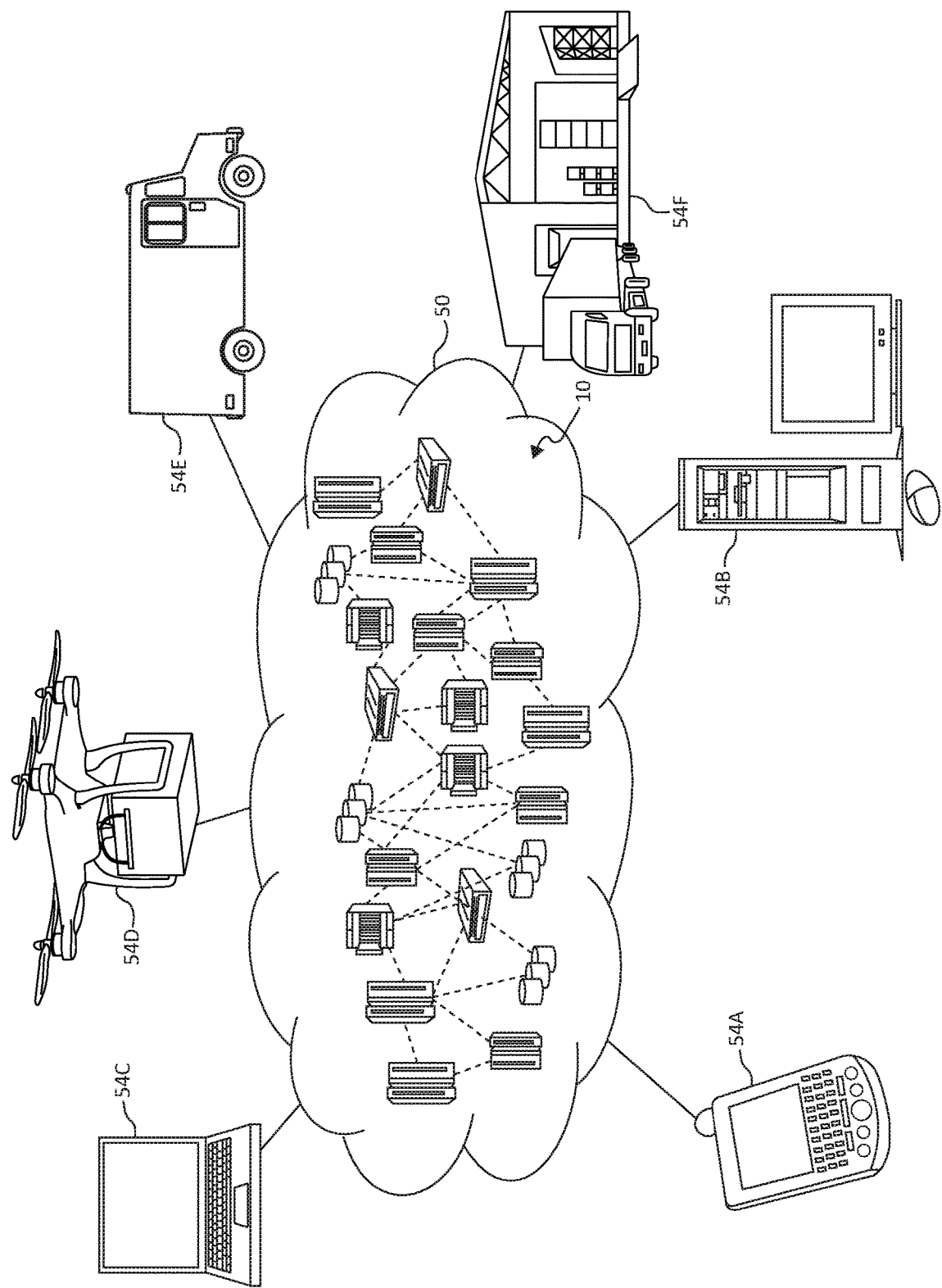
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and drone management computer systems, such as, for example, those in drones 54D, ground vehicles 54E, and warehouses 54F, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-F shown in FIG. 2 are intended to be illustrative only and that computing nodes 10 and cloud computing environment 50 can communicate with any type of computerized device over any type of network and/or network addressable connection (e.g., using a web browser).

Figure 3:
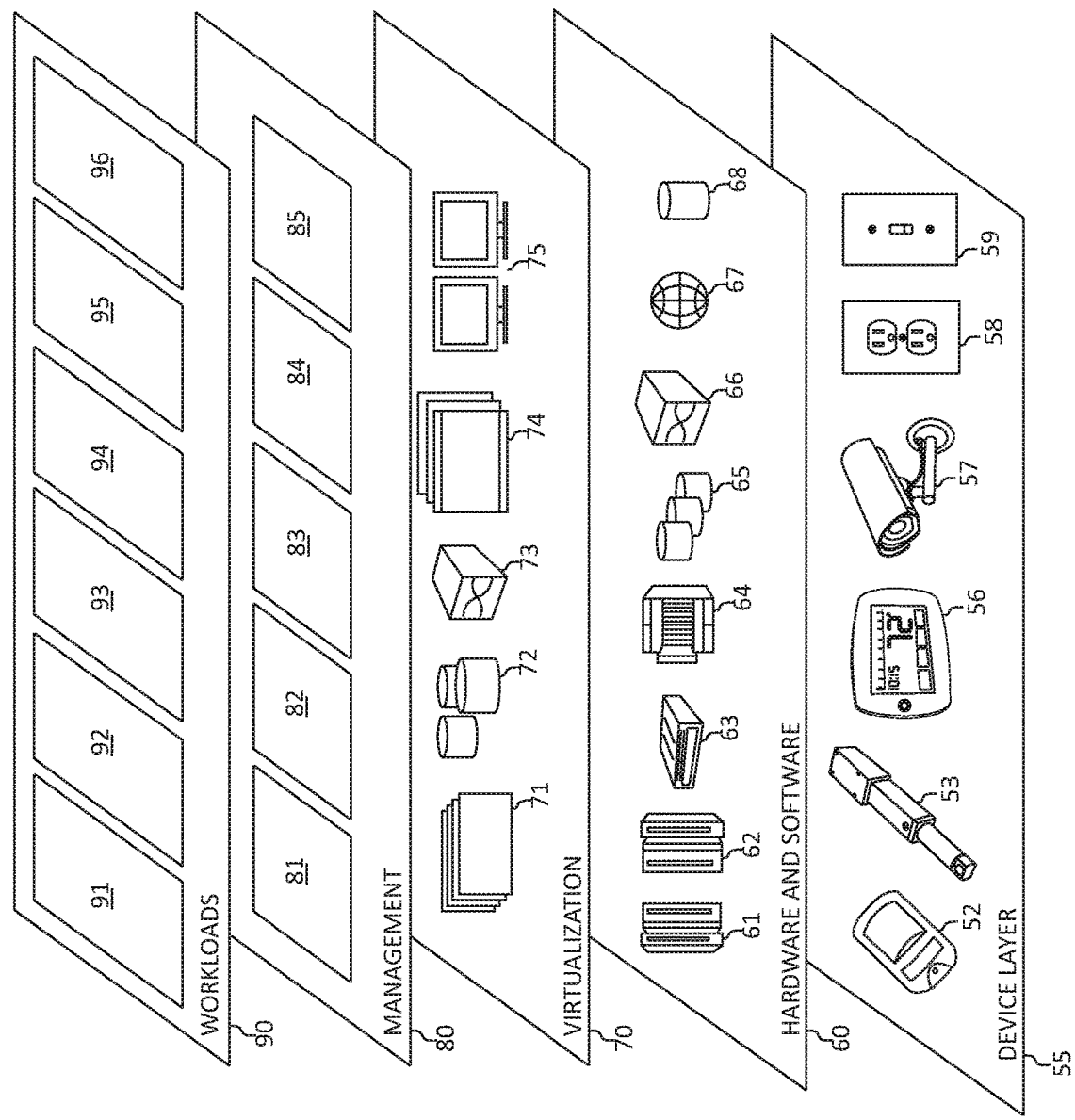
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones (e.g., UAVs) and ground vehicles (e.g., UGVs), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones and/or ground vehicles. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing drones, particularly when traveling in, and/or near, regulated spaces. The methods and systems include a data collection aspect, where a variety of information may be collected about drones and ground vehicles (e.g., ownership, origination points, destinations, and routes) and any regulated spaces in the general vicinity of the drones and/or the ground vehicles. Additionally, the information may include, for example, the current date/season and weather data (e.g., temperature, chance of precipitation, etc.) associated with the region(s) in which the drones are to travel. In some embodiments, the system(s) described herein (and/or one or more processors associated therewith) control the drones and/or the ground vehicles in the manner(s) described below and/or otherwise enable or cause the various functionalities described to be performed.

Figure 4:
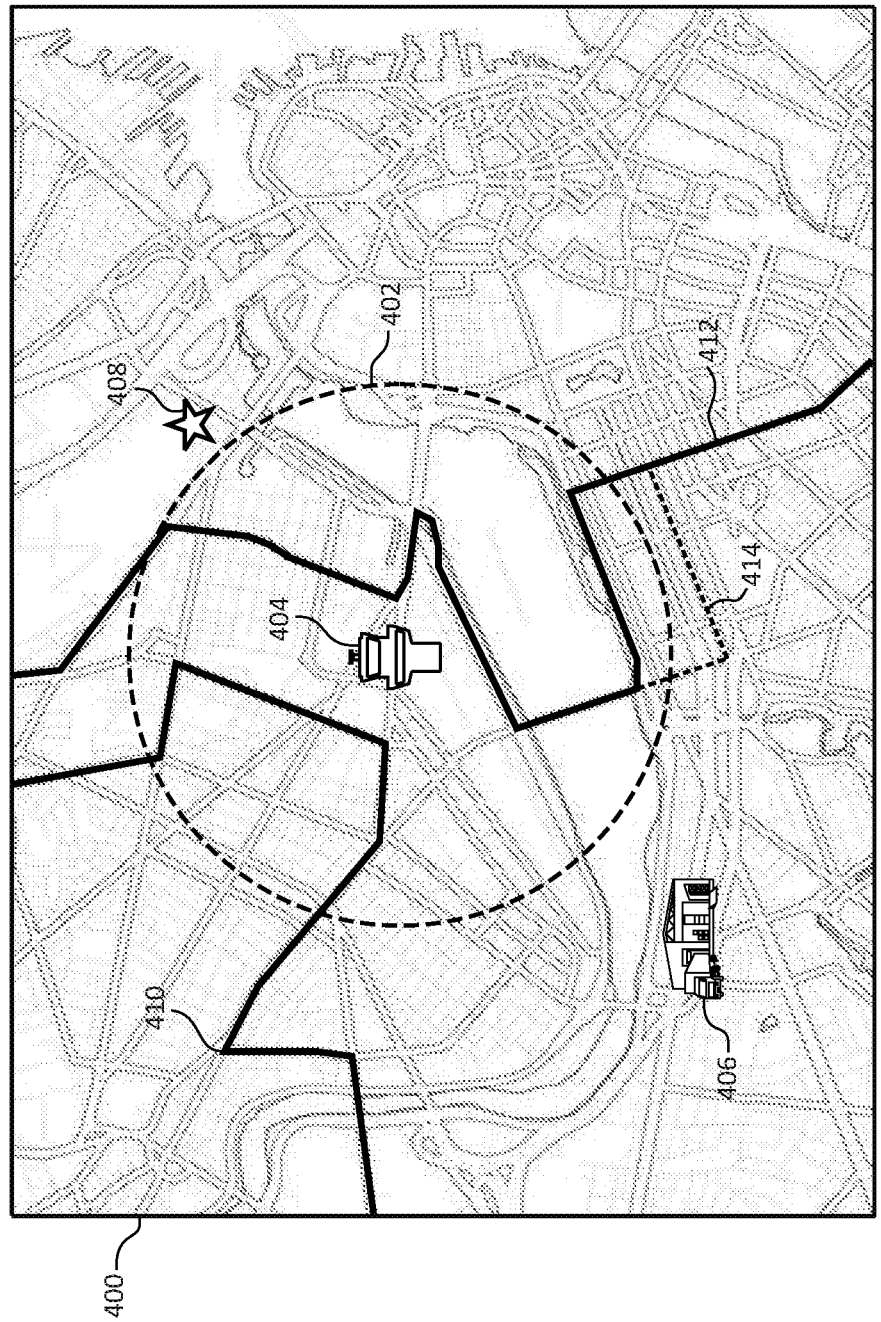
FIG. 4 is a plan view of a map showing a regulated space and several ground vehicle routes in the vicinity of the regulated space according to an embodiment of the present invention.

Referring to FIG. 4, a map 400 of a particular geographic region, having various roadways and geographic features, is shown. On the map 400, a regulated space 402 within the region is shown. The regulated space 402 may be, for example, any defined (or established or predetermined) region, or any space above such a region (i.e., an airspace), in which it has been deemed to be undesirable to allow drones (e.g., UAVs) to travel within, at least under specific circumstances.

In the particular embodiment shown, the regulated space 402 is essentially in the shape of a circle in which an airport 404 is positioned. However, it should be understood that the regulated spaces described herein may be defined or assigned at any location and may be in different shapes, and may be associated with particular altitudes (i.e., in embodiments related to aerial drones). For example, the regulated spaces may be associated with (e.g., defined around) military installations or particular portions of a city (e.g., neighborhoods in which the residents have decided they do not want drones freely travelling near their homes).

It should also be understood that the regulated spaces may only be activated under certain circumstances. For example, in some embodiments, the regulated space(s) is only activated at (or on) particular times of the day, days, seasons, etc. Further, the regulated spaces may be activated based on activity in the area, such as weather conditions. For example, the regulated spaces may be activated if the area is experiencing high winds and/or precipitation. In some embodiments, the regulated space is only related/applicable to particular types of drones. For example, the regulated space may only be related or applied to aerial drones (but not ground-based drones) or aerial drones that have cameras installed thereon. Further, the regulated space may be selectively applied to drones based on the ownership of the drone. For example, the regulated space may not be applied to drones that are recognized as being associated with a carrier known to make deliveries in that area.

Still referring to FIG. 4, in the depicted embodiment, an origination point 406 and a destination 408 for an aerial drone (e.g., UAV) are also indicated on the map 400. In some embodiments, such as the one shown in FIG. 4, the origination point 406 is a warehouse and the destination 408 is a delivery point (e.g., customer address) for an item being delivered. However, it should be understood that the origination point 406 may be any location from which the aerial drone begins traveling to the destination 408 (e.g., a private residence), and the destination 408 may be any location where the aerial drone is scheduled to perform its intended task (e.g., monitoring an area, taking measurements, etc.).

As will be described in detail below, an aerial drone may depart from the origination point (or warehouse) 406 and eventually travel to the destination (or delivery point) 408. However, as is evident in FIG. 4, the most direct route for a drone traveling from the warehouse 406 to the destination 408 extends through the regulated space 402 and/or the total distance the aerial drone would have to travel would be significantly increased if the aerial drone traveled around the regulated space 402.

In some embodiments, routes for ground vehicles which are scheduled to travel within the vicinity are identified. In the depicted embodiment, two such routes are shown, route 410 and route 412, each of which may correspond to a respective ground vehicle (e.g., UGV). The ground vehicles may be any suitable vehicle, such as private vehicles, government vehicles, or commercial vehicles (e.g., a delivery vehicle, service vehicle, etc., associated with the warehouse 406 and/or any other organization). In the embodiment shown in FIG. 4, both route 410 and 412 traverse (or extend through) the regulated space 402.

In some embodiments, one of the routes (and/or the associated ground vehicle) is selected to assist an aerial drone (e.g., a UAV) in traversing the regulated space 402. The selection of the route (and/or ground vehicle) may be based on, for example, the extent to which the route(s) extend through the regulated space, the time at which the ground vehicle(s) are expected to be at particular locations along the route(s), the ease (and/or willingness and/or ability) of the ground vehicle(s) (and/or the operators thereof) to alter the route(s), a price associated with the ground vehicle(s) assisting the drone, and/or the ability of the ground vehicle(s) to refuel (or recharge) the drone. In some embodiments, after a route is selected, the route may be modified or altered in such a way to assist the aerial drone (e.g., reduce the distance the aerial drone has to fly).

In the example depicted in FIG. 4, route 412 (and/or the associated ground vehicle) is selected. In this particular example, route 412 is (also) modified (or altered) so that the route 412 crosses into the regulated space 402 at a location that is closer to the warehouse 406, as indicated by the amended/modified route portion 414 (shown in dashed lines in FIG. 4).

Figure 5:
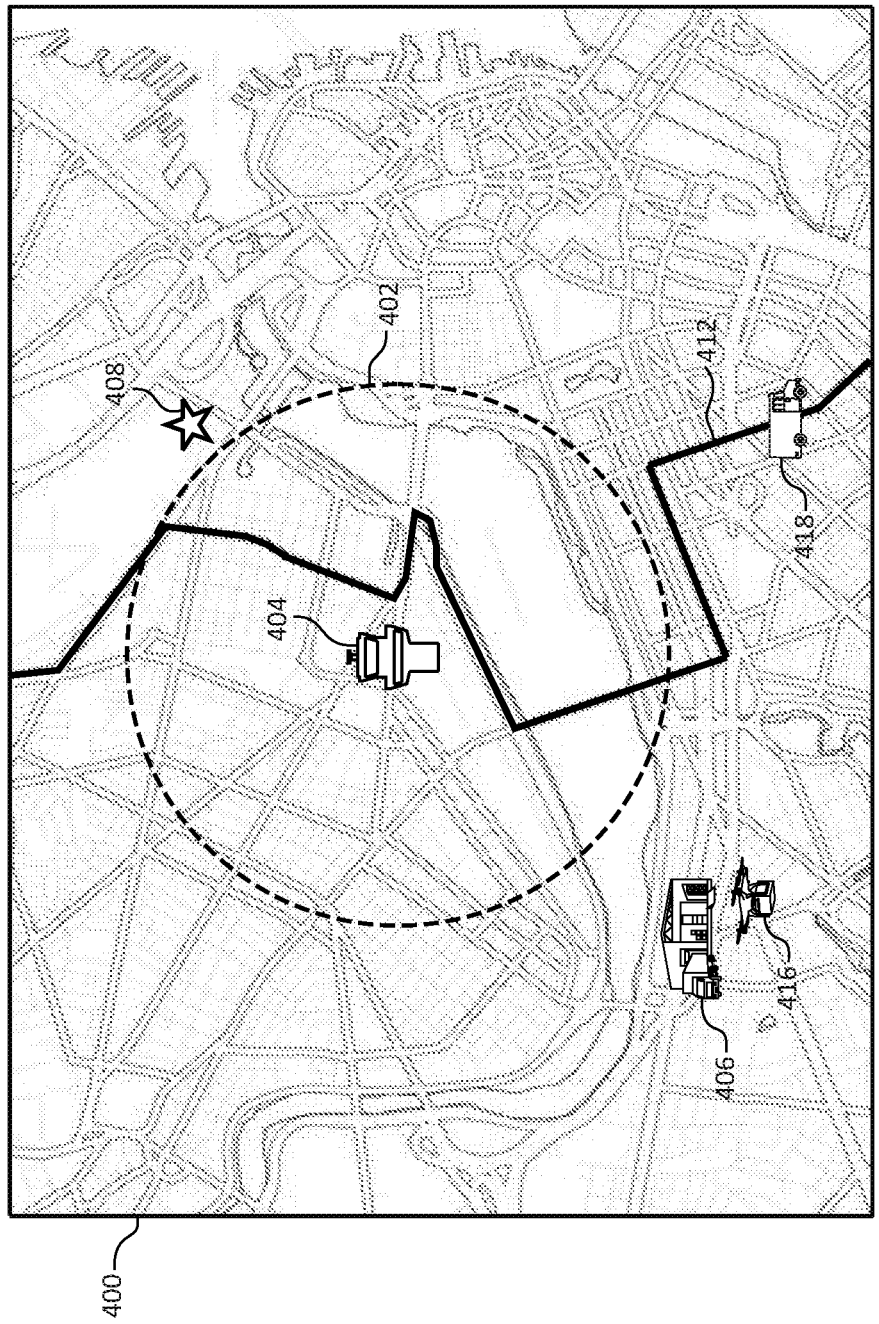
FIGS. 5-9 are plan views of the map of FIG. 4 showing an aerial drone traveling through the regulated space with the assistance of a ground vehicle according to an embodiment of the present invention.

FIG. 5 illustrates the map 400 with the modified route 412 shown as being selected (i.e., route 410 is no longer shown). In some embodiments, after a route is selected (e.g., route 412), and perhaps modified, the departure of an aerial drone (e.g., UAV) 416 from the warehouse 406 is coordinated with the scheduled time and location of a ground vehicle (e.g., a delivery vehicle) 418 along route 412. The departure of the UAV 416 from the warehouse 406 may be timed so that the UAV 416 will meet with the ground vehicle 418 at a particular time and place along the modified route 412. As shown in FIG. 5, the UAV 416 has departed from the warehouse 406 while the ground vehicle 418 is still some distance away from the point (or location) at which the modified route 412 crosses into the regulated space 402.

Figure 6:
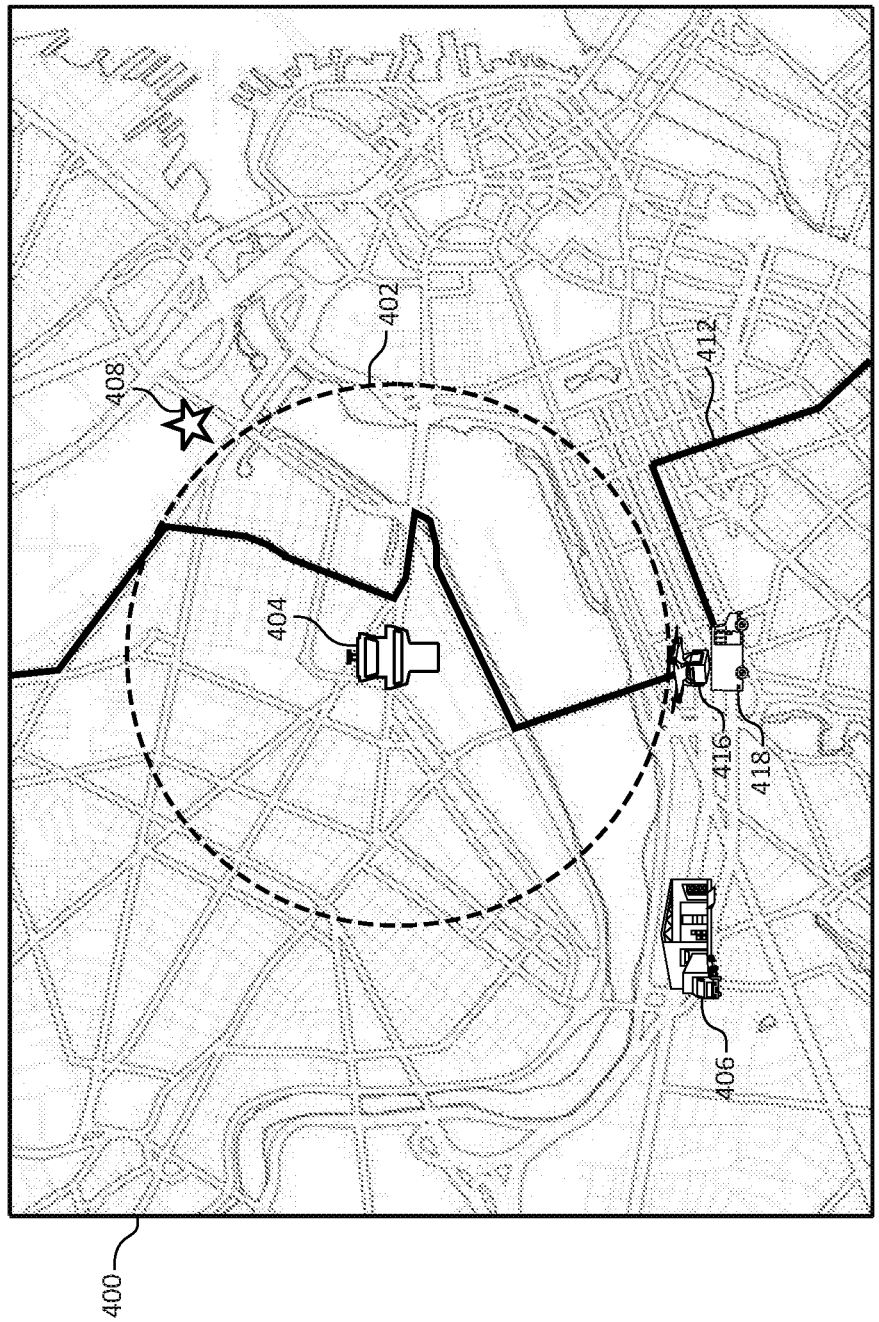

Referring now to FIG. 6, in some embodiments, the UAV 416 rendezvous with (and/or couples to) the ground vehicle 418 at a first location outside of the regulated space 402 (e.g., along route 412). In the example shown in FIG. 6, the first location is the point (or location) of the route 412 just before the route 412 extends into the regulated space 402 (i.e., the location(s) of the UAV 416 and ground vehicle 418 shown in FIG. 6). It should be noted that in the depicted embodiment route 412 did not traverse (or extend through) the first location before it was modified/altered. In some embodiments, the movements of the UAV 416 and the ground vehicle 418 are coordinated such that the aerial drone 416 couples to the ground vehicle 418 at a convenient location (e.g., a point along the route where the ground vehicle is already scheduled to stop and/or a traffic light).

In some embodiments, the UAV 416 may couple to the ground vehicle 418 at a point farther from the regulated space 402 (e.g., if the route 412 happens to pass right by the warehouse 406). In some embodiments, at the first location, the UAV 416 detachably couples to (or is detachably coupled to) the ground vehicle 418. For example, the UAV 416 may land on a portion of the ground vehicle 418 and/or be secured to the ground vehicle 418 (e.g., using clamps, straps, etc.).

In some embodiments, before (or during or after) the UAV 416 couples to the ground vehicle 418, an indication (e.g., a message) is sent to the ground vehicle 418 (or an operator or control system thereof) to inform the ground vehicle 418 that the UAV 416 intends to couple to (e.g., land on) the ground vehicle 418. A reply message may be sent to the UAV 416 (or an operator or control system thereof) indicating that such an action has been approved. The messaging between the UAV 416 and the ground vehicle 418 may include making arrangements for a payment of some sort (i.e., a payment/cost for the ground vehicle 418 assisting the UAV 416). In some embodiments, the ground vehicle 418 is capable of refueling or recharging the UAV 416 (e.g., charging a battery on the UAV 416), which may be accounted for in the arrangement of any payments (in such embodiments).

Figure 7:
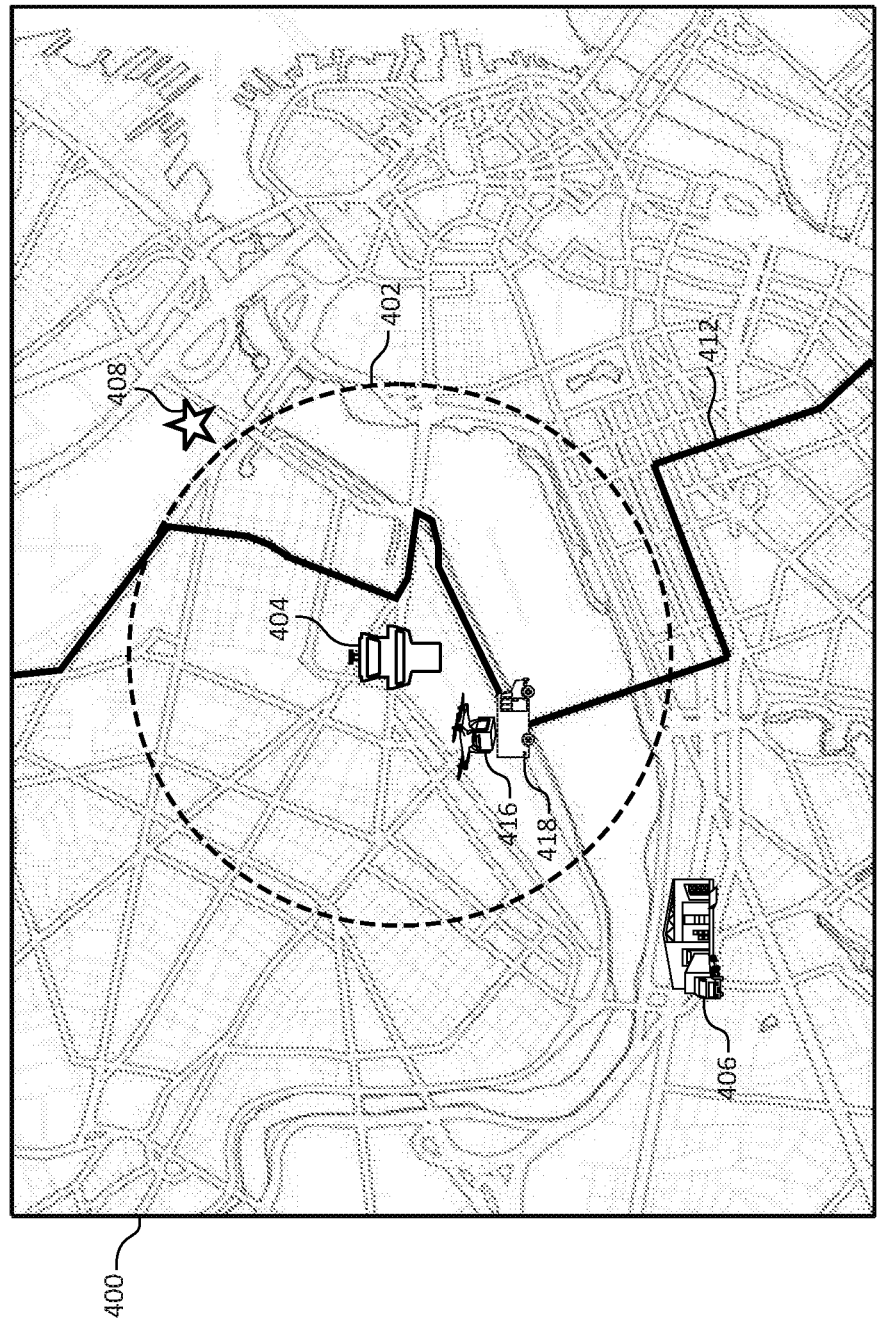

As shown in FIG. 7, after the UAV 416 couples to the ground vehicle 418 at the first location outside of the regulated space 402, the ground vehicle 418 continues to travel along route 412, into the regulated space 402, with the UAV 416 coupled thereto (i.e., the UAV 416 is not in flight but is being transported by the ground vehicle 418). In some embodiments, the UAV 416 remains coupled to the ground vehicle 418 the entire time the ground vehicle 418 (and/or the UAV 416) is within the regulated space 402.

Figure 8:
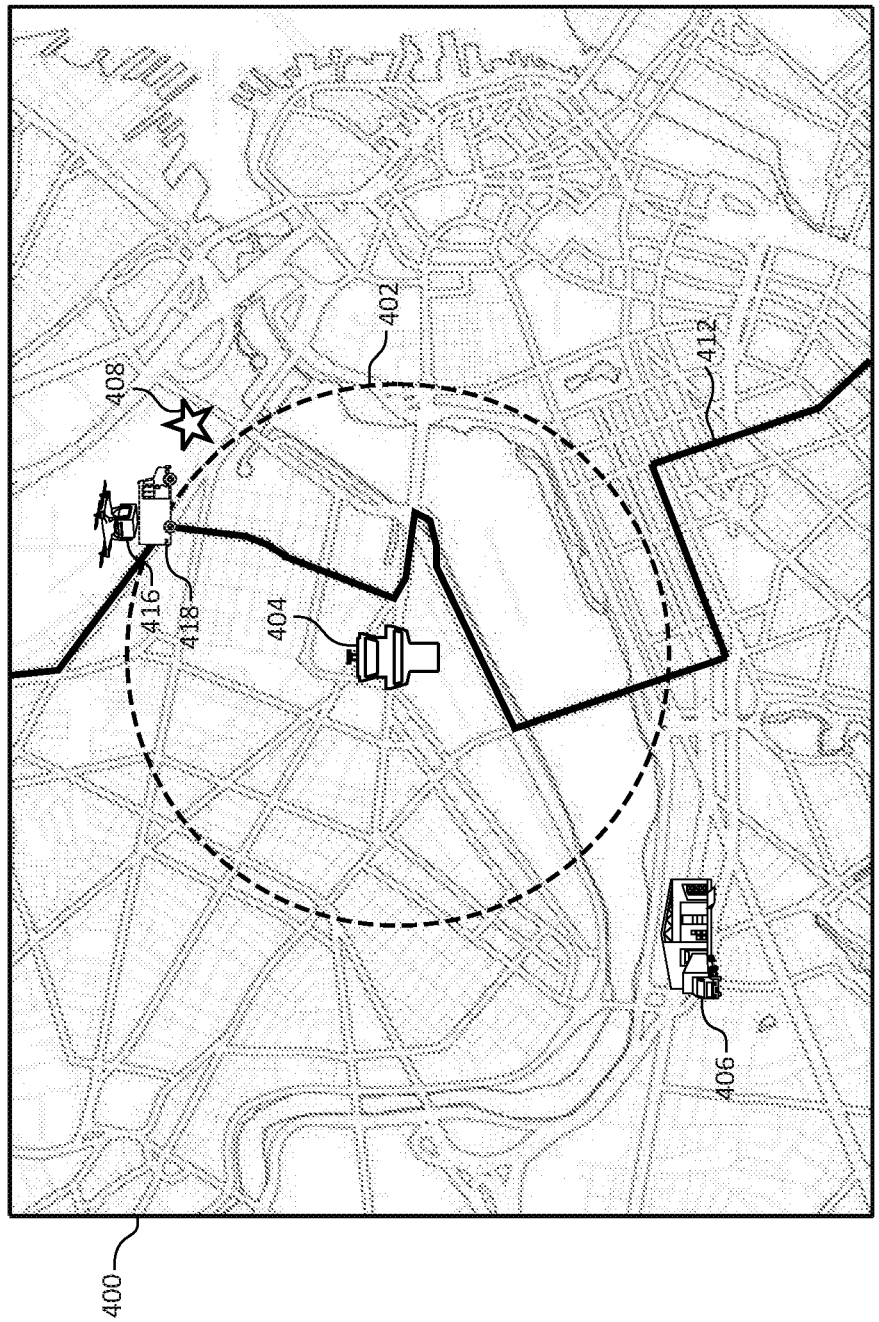

Referring now to FIG. 8, after the ground vehicle 418 (and the UAV 416) travels out of the regulated space 402 (e.g., along route 412), at a second location outside of the regulated space 402, the UAV 416 departs (or leaves) the ground vehicle 418. More specifically, the UAV 416 detaches (or takes off or flies away) from the ground vehicle 418 at the second location. In the example shown in FIG. 8, the second location is the point (or location) of the route 412 just after the route 412 extends out of the regulated space 402 (i.e., the location(s) of the UAV 416 and ground vehicle 418 shown in FIG. 8).

In the example shown in FIG. 8, the second location is on a side of the regulated space 402 opposite the first location, just outside of the regulated space 402. However, it should be understood that in some embodiments the UAV 416 may remain coupled to the ground vehicle 418 for a longer period of time (e.g., if the route 412 continues in a direction that would take the UAV 416 closer to the destination 408). That is, the time/place at which the UAV 416 departs from the ground vehicle 418 may be determined in such a way to optimize one or more parameters of the operation of the UAV 416 (e.g., total travel time to the destination, power used, etc.)

Figure 9:
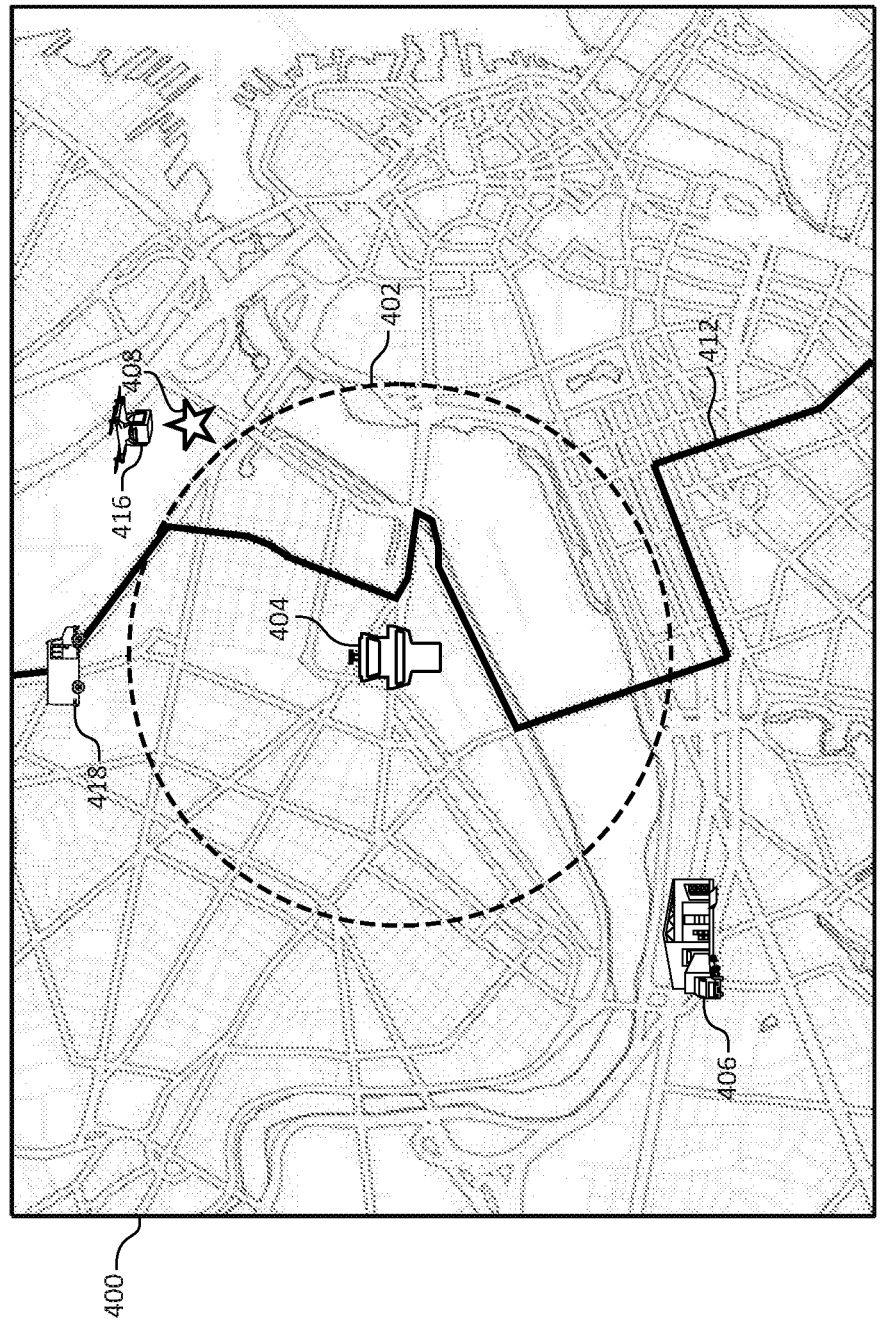

As shown in FIG. 9, after the UAV 416 detaches from the ground vehicle 418 at the second location, the UAV 416 may continue (e.g., fly) to the destination 408 (a third location outside of the regulated space 402) to, for example, deliver an item or perform some other task, and the ground vehicle 418 may continue (e.g., drive) along route 412 as scheduled. In this manner, the ground vehicle 418 may assist the UAV 416 in traveling through the regulated space 402 in a permissible manner (e.g., on the ground, as opposed to flying), thus allowing the UAV 416 to complete its intended task and/or extending the range of the UAV 416.

Although not shown, it should be understood that the method(s) described above may then be performed in reverse so that the UAV 416 is transported through the regulated space 402 in the opposite direction, back towards the warehouse 406, by a ground vehicle (e.g., ground vehicle 418 or another ground vehicle) that is scheduled to follow a route in such a direction. It should also be understood that although only one regulated space 402 is shown, the method(s) described above may be repeated if necessary in order to transport the UAV 416 through multiple regulated spaces on its way to the destination 408.

Further, the method(s) described above may be utilized to simply extend the range of aerial drones and/or decrease the overall travel time of the drones to their destinations (e.g., the ground vehicle may travel faster than the aerial drone can fly), regardless of the presence of any regulated spaces. Also, in some embodiments, multiple aerial drones may be coupled to (e.g., land on) a single ground vehicle (i.e., more than one drone may "hitch a ride" on one ground vehicle). In some embodiments, an aerial drone may be transported from one ground vehicle to another ground vehicle within a regulated space. For example, if the regulated space is relatively large and/or a single ground vehicle is not suitably traversing the regulated space, at some location within the regulated space, the aerial drone(s) may be transferred from a first ground vehicle that transported the aerial drone(s) into the regulated space to a second ground vehicle that will transport the aerial drone(s) out of the regulated space. In such embodiments, the transferring of the aerial drone(s) may be done in a manner that is permissible within the regulated space (e.g., manually transferring the aerial drone or flying the aerial drone(s) a very short distance, for example, at a low altitude).

It should also be understood that in some embodiments the aerial drone(s) may depart from an origination point that is within a regulated space. In such embodiments, the aerial drone(s) may first be transferred onto the ground vehicle(s) in a manner permissible within the regulated space, transported out of the regulated space via the ground vehicle(s), and then depart from the ground vehicle(s) at an appropriate location outside of the regulated space.

Figure 10:
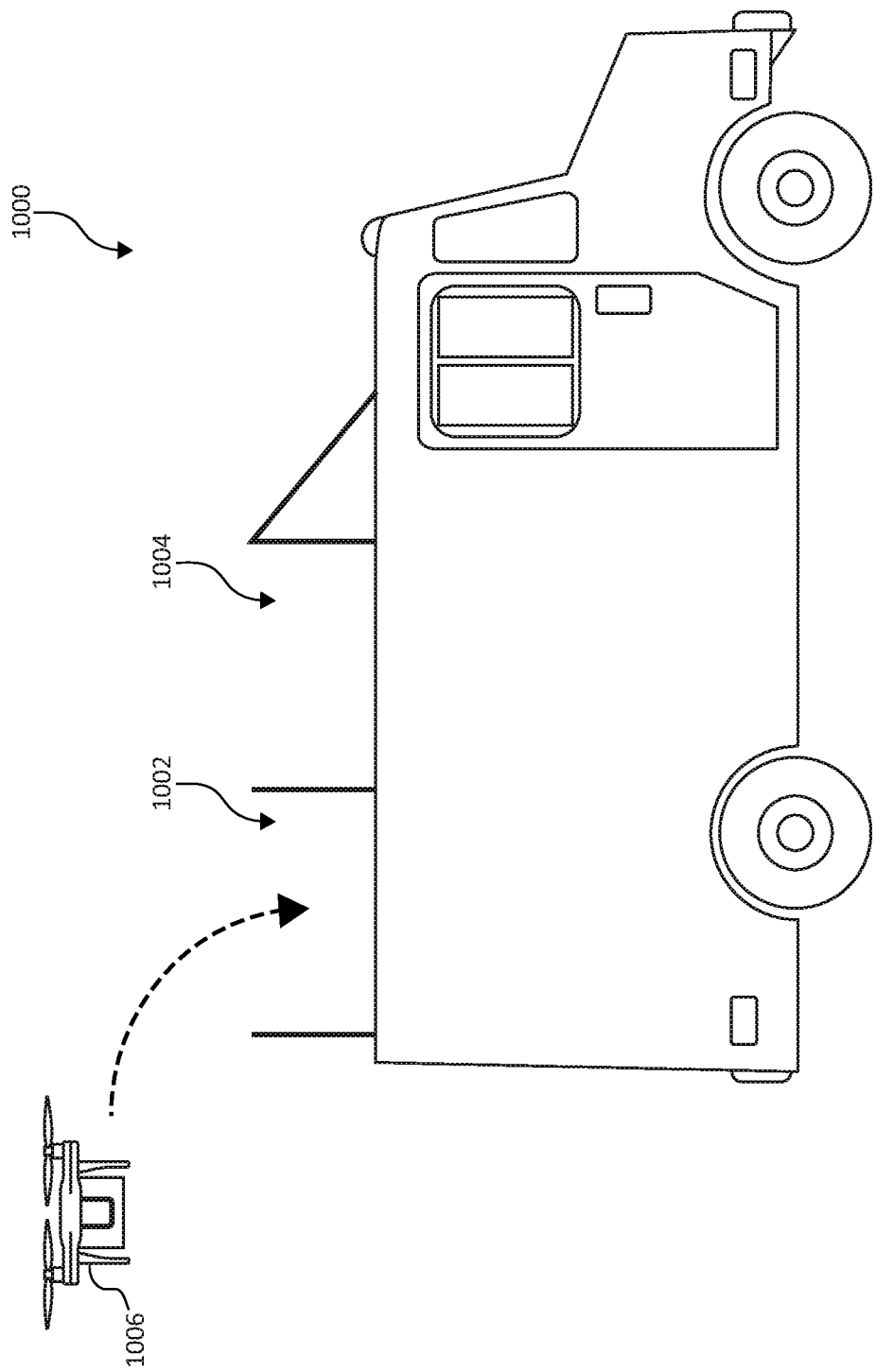
FIGS. 10 and 11 are simplified side views of a ground vehicle and an aerial drone according to an embodiment of the present invention.
Figure 11:
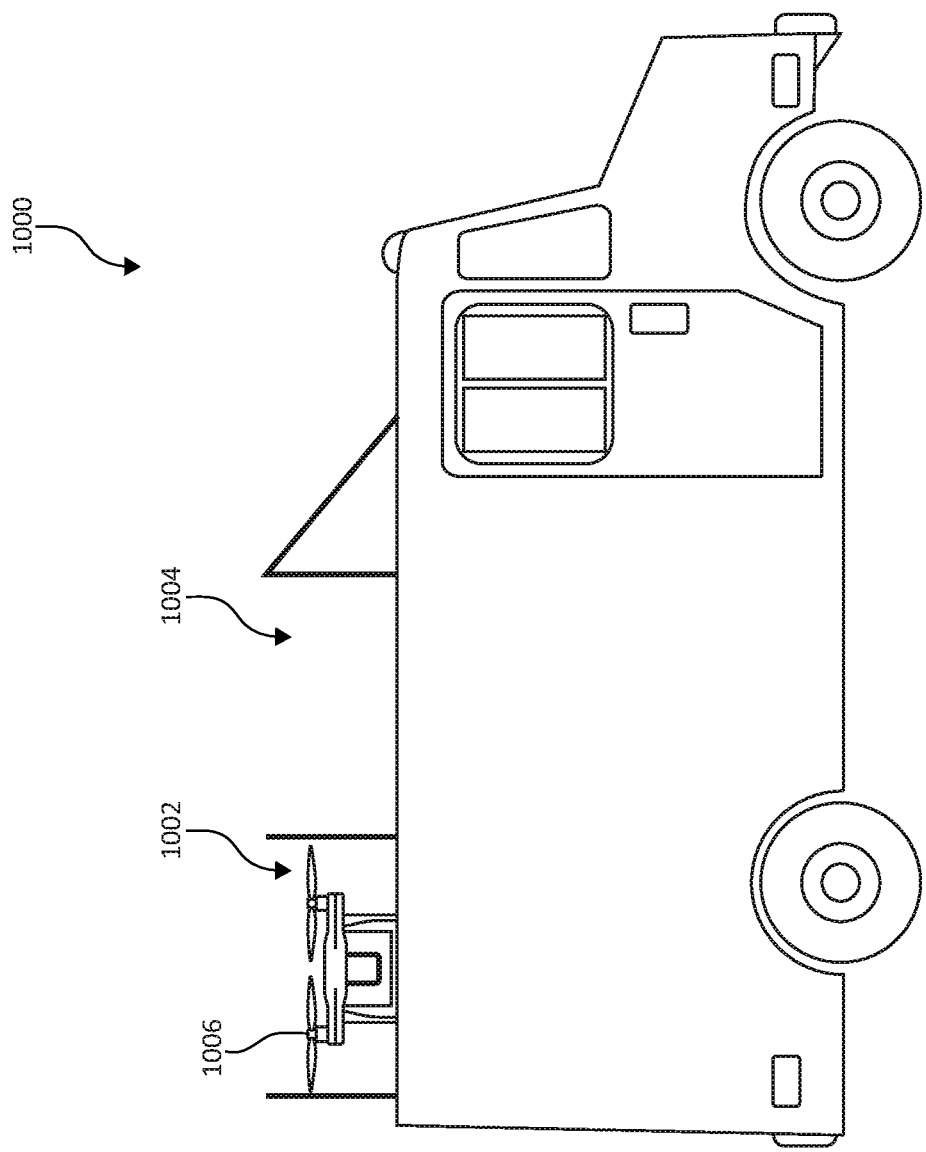

FIGS. 10 and 11 are simplified illustrations of an exemplary ground vehicle (e.g., a delivery or service vehicle) 1000, according to some embodiments of the present invention. Of particular interest is that the ground vehicle 1000 includes drone storage mechanisms 1002 and 1004. In the depicted embodiment, the drone storage mechanisms 1002 and 1004 are in the form of bins or containers, on the roof of the ground vehicle 1000, that are suitably sized and shaped to hold an aerial drone (e.g., UAV) 1006. In some embodiments, the aerial drone 1006 detachably couples to the ground vehicle 1000 by, for example, landing within one of the drone storage mechanisms (e.g., drone storage mechanism 1002).

The drone storage mechanisms 1002 and 1004 may be equipped to secure the aerial drone 1006 in such a manner that the aerial drone 1006 will not slide or fall off the ground vehicle 1000 while the ground vehicle 1000 is moving. For example, in the depicted embodiment, the bins formed by the drone storage mechanisms 1002 and 1004 may have a depth sufficient to prevent the aerial drone 1006 from falling off the ground vehicle 1000. However, although not specifically shown, the ground vehicle 1000 (and/or the drone storage mechanisms 1002 and 1004) may include devices such as lids (for the bins), straps, clamps, magnets (e.g., electromagnets), etc. to secure the aerial drone 1006. Such devices may be suitably activated/deactivated (e.g., in an automated manner) when the aerial drone 1006 couples to (e.g., lands on) and detaches from (e.g., flies away from) the ground vehicle 1000.

Additionally, in some embodiments, the aerial drone 1006 is equipped to alter or modify its overall size and/or shape when coupled to the ground vehicle 1000. For example, the aerial drone 1006 may be able to reduce its overall height and/or width by, for example, retracting (or partially retracting) its landing gear and/or its rotors (e.g., when the aerial drone is in a quad-copter configuration). Such functionality of the aerial drone 1006 may assist in securing the aerial drone 1006 to the ground vehicle 1000 and/or optimize overall efficiency of the system (e.g., by reducing aerodynamic resistance).

Further, in some embodiments, the ground vehicle 1000 (and/or the drone storage mechanisms 1002 and 1004) may be equipped to refuel the aerial drone 1006 while the aerial drone 1006 is coupled to the ground vehicle 1000. For example, in embodiments in which the aerial drone 1006 includes a battery (e.g., an electric aerial drone), the ground vehicle 1000 (and/or the drone storage mechanisms 1002 and 1004) may be capable of providing a charge to the battery.

Figure 12:
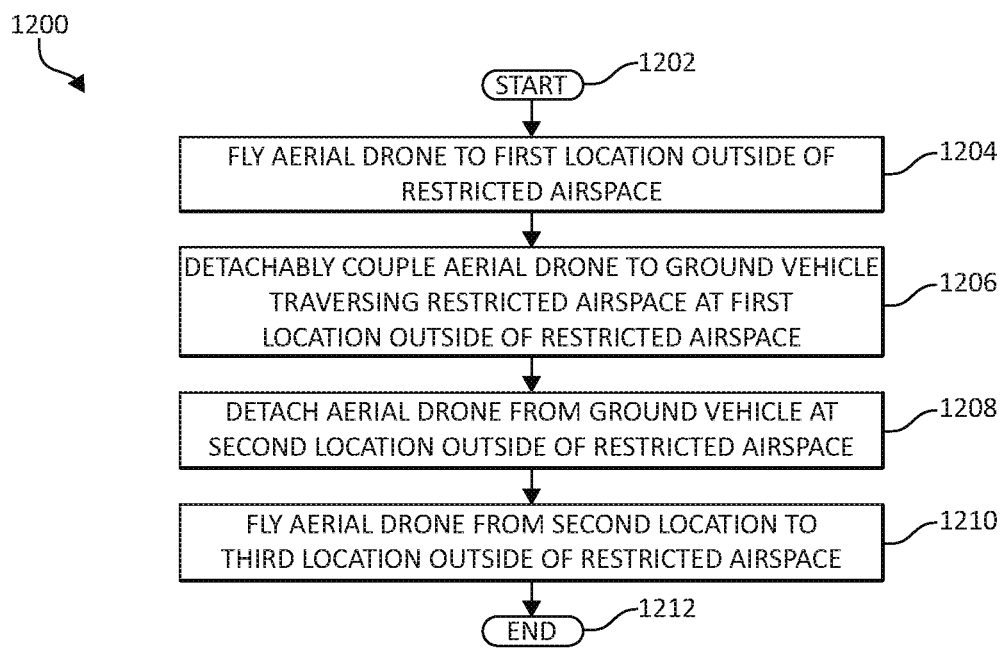
FIG. 12 is a flowchart diagram depicting an exemplary method for managing drones in which various aspects of the present invention may be implemented.

Turning to FIG. 12, a flowchart diagram of an exemplary method 1200 for managing drones, in which aspects of the present invention may be implemented, is illustrated. Method 1200 begins (step 1202) with, for example, an aerial drone being scheduled to travel from an origination point to a destination with a regulated space (e.g., a restricted airspace) being positioned along a possible flight path (e.g., positioned between the origination point and the destination). Additionally, the routes of ground vehicles within the vicinity may be identified.

The aerial drone flies (or is controlled or enabled to fly) to a first location outside of the restricted airspace (step 1204). As described above, the first location may be a point along a (possibly modified) route of a ground vehicle that is scheduled to travel through (or traverse) the restricted airspace. The aerial drone detachably couples (or is controlled or enabled to detachably couple) to the ground vehicle at the first location outside of the restricted airspace (step 1206). As described above, the aerial drone may land on and/or otherwise be secured to the ground vehicle. In some embodiments, before the aerial drone couples to the ground vehicle, a message is sent to the ground vehicle (or an operator thereof) indicating that the aerial drone intends to, for example, land on the ground vehicle. The aerial drone may remain coupled to the ground vehicle while the ground vehicle travels through the restricted airspace.

When the ground vehicle (and the aerial drone) arrives at a second location outside of the restricted airspace, the aerial drone detaches (or is controlled or enabled to detach) from the ground vehicle (step 1208) (e.g., the aerial drone takes off and/or flies away from the ground vehicle). The second location outside of the restricted airspace may be, for example, on a side of the restricted airspace that is opposite, or substantially opposite, the first location outside of the restricted airspace. The aerial drone then flies (or is controlled or enabled to fly) from the second location outside of the restricted airspace to a third location outside of the restricted airspace (step 1210).

Method 1200 ends (step 1212) with, for example, the aerial drone performing its intended task at the third location. For example, the aerial drone may deliver (or retrieve) an item at the third location, monitor the third location, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing drones, comprising:
controlling an aerial drone to fly to a first location outside of a restricted airspace;
enabling the aerial drone to detachably couple to a ground vehicle at the first location outside of the restricted airspace, wherein the ground vehicle travels through the restricted airspace from the first location outside of the restricted airspace to a second location outside the restricted airspace, and wherein the ground vehicle is selected from a plurality of ground vehicles, each of the plurality of ground vehicles having an identified route, determined prior to a departure of the aerial drone from the first location, that traverses the restricted airspace such that the departure of the aerial drone from the first location is timed according to meet the ground vehicle at a particular time and location along the identified route;
upon detachably coupling to the ground vehicle, automatically modifying one or more physical properties of the aerial drone to alter an overall size or shape of the aerial drone to secure the aerial drone to the ground vehicle;
enabling the aerial drone to detach from the ground vehicle at the second location outside of the restricted airspace; and
controlling the aerial drone to fly from the second location outside of the restricted airspace to a third location outside of the restricted airspace.

2. The method of claim 1, further including
identifying a route of the ground vehicle, wherein the route of the ground vehicle does not traverse the first location outside of the restricted airspace; and
modifying the route of the ground vehicle, wherein said modified route of the ground vehicle traverses the first location outside of the restricted airspace.

3. The method of claim 1, further including generating a signal indicative of the aerial drone detachably coupling to the ground vehicle.

4. The method of claim 1, wherein the detachably coupling of the aerial drone to the ground vehicle includes landing the aerial drone on the ground vehicle.

5. The method of claim 1, further including charging the aerial drone while the aerial drone is detachably coupled to the ground vehicle.

6. A system for managing drones, comprising:
at least one processor that
controls an aerial drone to fly to a first location outside of a restricted airspace;
enables the aerial drone to detachably couple to a ground vehicle at the first location outside of the restricted airspace, wherein the ground vehicle travels through the restricted airspace from the first location outside of the restricted airspace to a second location outside the restricted airspace, and wherein the ground vehicle is selected from a plurality of ground vehicles, each of the plurality of ground vehicles having an identified route, determined prior to a departure of the aerial drone from the first location, that traverses the restricted airspace such that the departure of the aerial drone from the first location is timed according to meet the ground vehicle at a particular time and location along the identified route;
upon detachably coupling to the ground vehicle, automatically modifies one or more physical properties of the aerial drone to alter an overall size or shape of the aerial drone to secure the aerial drone to the ground vehicle;
enables the aerial drone to detach from the ground vehicle at the second location outside of the restricted airspace; and
controls the aerial drone to fly from the second location outside of the restricted airspace to a third location outside of the restricted airspace.

7. The system of claim 6, wherein the at least one processor:
identifies a route of the ground vehicle, wherein the route of the ground vehicle does not traverse the first location outside of the restricted airspace; and
modifies the route of the ground vehicle, wherein said modified route of the ground vehicle traverses the first location outside of the restricted airspace.

8. The system of claim 6, wherein the at least one processor generates a signal indicative of the aerial drone detachably coupling to the ground vehicle.

9. The system of claim 6, wherein the detachably coupling of the aerial drone to the ground vehicle includes landing the aerial drone on the ground vehicle.

10. The system of claim 6, wherein the at least one processor enables the aerial drone to be charged while the aerial drone is detachably coupled to the ground vehicle.

11. A computer program product for managing drones by one or more processors, the computer program product comprising a non-transitory computer-readable storage medium having computer-readable program code portions stored therein, the computer-readable program code portions comprising:
an executable portion that controls an aerial drone to fly to a first location outside of a restricted airspace;
an executable portion that enables the aerial drone to detachably couple to a ground vehicle at the first location outside of the restricted airspace, wherein the ground vehicle travels through the restricted airspace from the first location outside of the restricted airspace to a second location outside the restricted airspace, and wherein the ground vehicle is selected from a plurality of ground vehicles, each of the plurality of ground vehicles having an identified route, determined prior to a departure of the aerial drone from the first location, that traverses the restricted airspace such that the departure of the aerial drone from the first location is timed according to meet the ground vehicle at a particular time and location along the identified route;
an executable portion that, upon detachably coupling to the ground vehicle, automatically modifies one or more physical properties of the aerial drone to alter an overall size or shape of the aerial drone to secure the aerial drone to the ground vehicle;
an executable portion that enables the aerial drone to detach from the ground vehicle at the second location outside of the restricted airspace; and
an executable portion that controls the aerial drone to fly from the second location outside of the restricted airspace to a third location outside of the restricted airspace.

12. The computer program product of claim 11, wherein the computer-readable program portions further include:
- an executable portion that identifies a route of the ground vehicle, wherein the route of the ground vehicle does not traverse the first location outside of the restricted airspace; and
- an executable portion that modifies the route of the ground vehicle, wherein said modified route of the ground vehicle traverses the first location outside of the restricted airspace.

13. The computer program product of claim 11, wherein the computer-readable program portions further include an executable portion that generates a signal indicative of the aerial drone detachably coupling to the ground vehicle.

14. The computer program product of claim 11, wherein the detachably coupling of the aerial drone to the ground vehicle includes landing the aerial drone on the ground vehicle.

15. The computer program product of claim 11, wherein the computer-readable program portions further include an executable portion that enables the aerial drone to be charged while the aerial drone is detachably coupled to the ground vehicle.

* * * * *